United States Patent Office 2,702,486
Patented Feb. 22, 1955

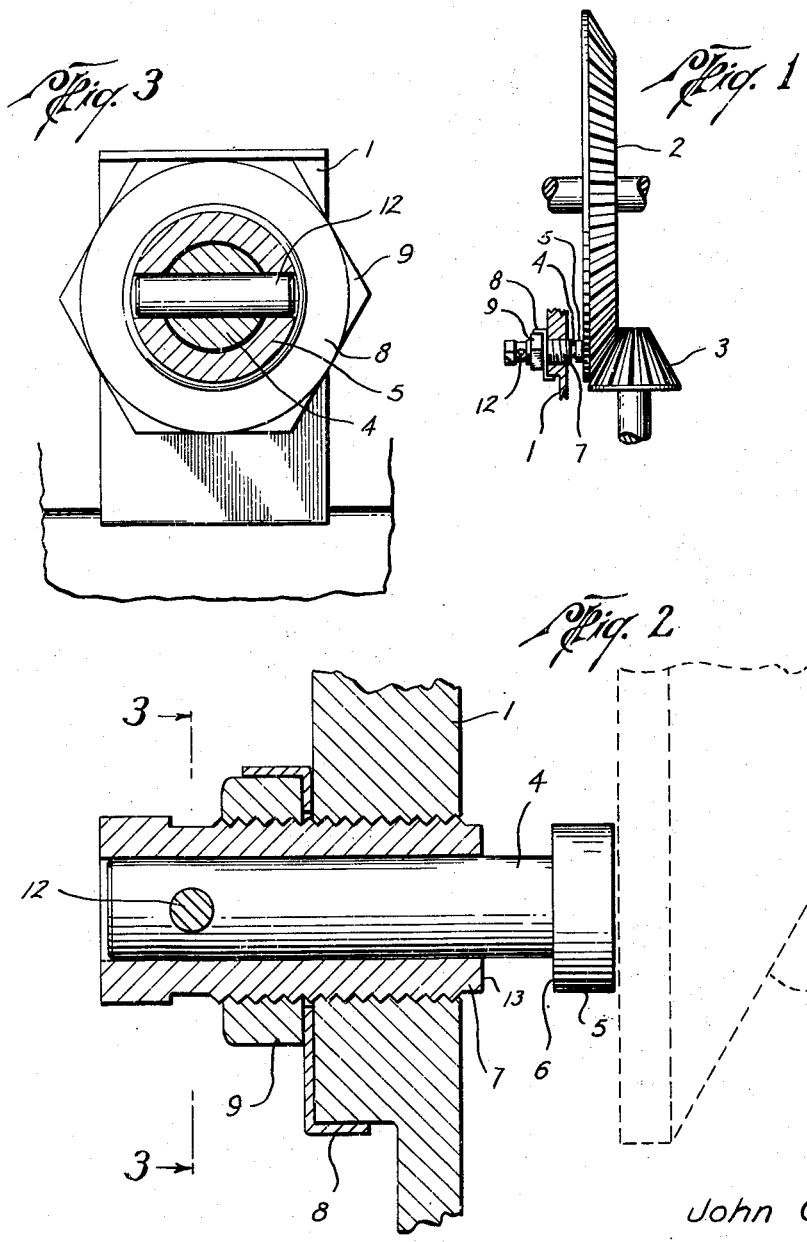

2,702,486

BACKUP BOLT

John Crowley, Houston, Tex.

Application June 27, 1952, Serial No. 296,051

5 Claims. (Cl. 74—417)

This invention relates to new and useful improvements in a backup bolt for use in transmission housings wherein a ring gear is used.

It is an object of this invention to provide a backup bolt that will cushion the displacement of a ring gear and protect the gear housing against destruction when a ring gear is displaced.

In heavy duty equipment, such as tractors, and the like, when the ring gear in the transmission becomes defective or the teeth of the gear become worn or broken, the ring gear overrides the pinion gear by which it is revolved and the overriding of the pinion forces the ring gear outwardly and, to protect the other gearing, a backup bolt is provided to attempt to control this ring gear. However, due to the force of the outward movement of the ring gear, the backup bolt is usually driven through the gear housing, causing major damage and requiring considerable time and expense in repairs. It is an object of this invention to provide a backup bolt that will yieldingly block the movement of the gear outwardly and then positively limit its outward movement, thus absorbing the first shock of the movement of the gear and then holding the gear within the housing, preventing the breaking of the housing and limiting the necessity for repairs to the ring gear and the shear pin of the backup bolt.

With the above and other objects in view, the invention has relation to certain novel features of construction and operation more particularly described in the following specifications and illustrated in the accompanying drawings, wherein:

Figure 1 is a side elevational view of a ring gear within a transmission, showing the backup bolt in guarding position.

Figure 2 is a side elevational view of the backup bolt, in cross section, and

Figure 3 is a front elevational view in cross section, taken on the line 3—3 of Figure 2.

Referring now more particularly to the drawings, the numeral 1 designates a gear housing such as may be found on an International Tractor, or the like, and the numeral 2 designates the ring gear in the transmission which is rotated by a pinion gear 3. The shaft 4 is longitudinally mounted in the sleeve 7, and has an enlarged head 5 forming an annular shoulder 6, on one side thereof. The sleeve 7 is externally threaded and mounted on the main frame of the housing 1 by means of the usual lock 8 and nut 9. A transverse bore 10 is formed adjacent one end of the shaft 4 and a cooperating bore 11 is formed in the sleeve 7. A shear pin, as 12, is mounted in the bores 10, 11, yieldingly anchoring the shaft 4 to the sleeve 7. The end of the sleeve 7 adjacent the head 5, forms a stop, as 13, to receive the annular shoulder of the head 5.

The shaft 4 is mounted in the sleeve 7, and the sleeve 7 is adjusted on the frame 1 so that the head 5 of the shaft 4 is immediately adjacent the ring gear 2, as shown in Figure 2, with merely a safe operating clearance between the ring gear 2 and the head 5.

In the event the teeth of the ring gear 2 become worn or broken, or for any reason the ring gear 2 overrides the pinion 3, and is forced outwardly against the head 5. The shaft 4 in the sleeve 7 will resist the outward movement of the ring gear 2, until the shear pin 12 yields and the shaft 4 will then move longitudinally within the sleeve 7, until the shoulder 6 abuts the stop 13 formed by the end of the sleeve 7, where the ring gear 2 will be held against further displacement, and the ring gear, having become entirely disengaged from pinion 3 will have lost its momentum and will have dissipated the shock of overriding the pinion 3 and will be easily stopped from further movement and from bringing about further damage.

As may be seen from the above, by employing the movable shaft in the sleeve, anchored by a yieldable shear pin, the strength of the shear pin being determined by the degree of shock generated by the transmission and which may be readily and easily replaced, an inexpensive shock absorbing means is supplied for receiving and exhausting the force of the ring gear when it becomes disengaged and the usual damage suffered from such disengagement is avoided.

While the foregoing is considered a preferred form of the invention, it is by way of illustration only, the broad principle of the invention being defined by the appended claims.

What I claim is:

1. In a safety device for transmissions having a ring gear therein, a sleeve having external threads thereon, a shaft in said sleeve having an enlarged head at one end adapted to be positioned adjacent the ring gear, means for adjustably maintaining said shaft in position with relation to the transmission gear and a shear pin mounted in said shaft at the other end adapted to yieldingly maintain the shaft against longitudinal movement in said sleeve.

2. In a transmission ring gear backup bolt, a shaft, a sleeve on said shaft, outside threads on said sleeve, locking means mounted on said sleeve maintaining said sleeve in position, one end of said shaft terminating adjacent the ring gear to be backed-up and the other end of said shaft having a transverse bore therethrough adapted to receive a shear pin, the ends of said shear pin extending outwardly from said shaft and yielding anchoring the shaft against longitudinal movement within the sleeve.

3. In a safety guard for use in a transmission housing having a ring gear, a backup bolt, one end of said backup bolt having an enlarged head forming an annular shoulder, a transverse bore adjacent the opposing end of said bolt, a shear pin mounted in said bore adapted to anchor said bolt against longitudinal movement in the bore, a sleeve mounted on said bolt having means for mounting said sleeve in said housing, one end of said sleeve forming a stop means adapted to contact said head and limiting the longitudinal movement of said bolt.

4. In a safety guard for a transmission housing having a ring gear, a backup bolt having one end enlarged forming an annular shoulder, a sleeve mounted on said backup bolt, one end of said sleeve being adjacent said annular shoulder on said backup bolt, said end forming a stop and limiting the longitudinal movement of said bolt, said bolt having a transverse bore adjacent one end thereof and said sleeve having a transverse bore normally in alignment with the bore in said bolt, and a shear pin mounted in said aligned transverse bores.

5. In a backup bolt for transmission housings having a ring gear, a sleeve mounted in a gear housing, a shaft mounted in said sleeve, one end of said shaft having an enlarged head, forming an annular shoulder, one end of said sleeve forming an annular abutment adapted to limit the longitudinal movement of said shaft, and a shear pin yieldingly anchoring said shaft in said sleeve.

References Cited in the file of this patent

UNITED STATES PATENTS

| 1,271,649 | Alpern | July 9, 1918 |
| 2,129,580 | Heslap | Sept. 6, 1938 |
| 2,133,112 | Ormsby | Oct. 11, 1938 |
| 2,348,292 | Gross | May 9, 1944 |
| 2,476,195 | Horman | July 12, 1949 |
| 2,539,630 | Krueger | Jan. 30, 1951 |
| 2,566,690 | Wright | Sept. 14, 1951 |
| 2,578,155 | Slider | Dec. 11, 1951 |
| 2,665,128 | Guffey | Jan. 5, 1954 |